(12) United States Patent
Chang et al.

(10) Patent No.: US 6,792,211 B1
(45) Date of Patent: Sep. 14, 2004

(54) COMPACT OPTICAL WAVELENGTH ADD/DROP MULTIPLEXER

(75) Inventors: Charles Z. Chang, Milpitas, CA (US); Yuehong Bai, Fremont, CA (US); Suyou He, Fremont, CA (US)

(73) Assignee: Tera FiberOptics, Fremont, CA (US)

( * ) Notice: Subject to any disclaimer, the term of this patent is extended or adjusted under 35 U.S.C. 154(b) by 553 days.

(21) Appl. No.: 09/811,251

(22) Filed: Mar. 15, 2001

(51) Int. Cl.[7] .......................... H04J 14/02; G02B 6/28; G02B 6/32
(52) U.S. Cl. .................. 398/85; 398/83; 398/82; 398/88; 385/24; 385/33; 385/34
(58) Field of Search .............. 398/83, 82, 85, 398/84, 87, 88; 385/34, 33, 24

(56) References Cited

U.S. PATENT DOCUMENTS 5,943,454 A * 8/1999 Aksyuk et al. ............. 385/22
6,185,347 B1 * 2/2001 Zheng ..................... 385/34
6,498,876 B1 * 12/2002 Liu et al. ................. 385/34

* cited by examiner

Primary Examiner—M. R. Sedighian
(74) Attorney, Agent, or Firm—John Schipper

(57) ABSTRACT

Method and system for selectively adding and dropping selected wavelength components $\lambda=\lambda k1$ and $\lambda=\lambda k2$ ($1 \leq k1 \leq k2 \leq K$) in a light signal having a sequence of wavelengths $\lambda k$ (k=1, 2, . . . , K), using a dual fiber collimator at each end of an OADM device that contains an optical filter that transmits a selected wavelength $\lambda k1$ and reflects the other wavelengths $\lambda k$. Connecting two optical communication terminals in a network allows addition and dropping of a selected wavelength. Estimated total optical insertion losses, between the common port and the express port, for 2×2 and 3×3 add/drop combinations are 0.4 dB and 0.8 dB, respectively.

9 Claims, 4 Drawing Sheets

COMPACT OPTICAL WAVELENGTH ADD/DROP MULTIPLEXER

FIELD OF THE INVENTION

This invention relates to adding and dropping of selected wavelength components in wavelength division multiplexing (WDM).

BACKGROUND OF THE INVENTION

Fiber optic telecommunication networks are increasingly used for data transmission because of the high data transfer rates available with such networks. A plurality of substantially different wavelength components can be transmitted along a single optical fiber, and these wavelength components can be combined and transmitted as a single signal. Each wavelength is referred to as a "channel." A crucial feature is exchange of wavelength components between signals propagating on "loops" within a network. This exchange occurs at connector points within a loop, or at points where two or more loops intersect.

Exchange of data signals involves exchange of matching wavelength components associated with two different loops within a network. In this exchange, a signal traveling on a first loop on the network drops a first wavelength component, which is picked up by a second loop, and simultaneously picks up a corresponding wavelength component that has been dropped by the second loop. Addition of a selected wavelength component and dropping of this wavelength component always occurs together, between first and second loops.

Conventional implementation of add/drop actions in a fiber optic WDM system often require use of more wavelength discrimination hardware than should be needed for such purposes. Each add/drop combination requires use of an add module and of a separate drop module. For example, a conventional 1×2 or 2×1 optical add/drop multiplexer (OADM) allows only addition of a wavelength component or dropping of a wavelength component, but not both at the same time, analogous to simplex operation of a transmission line in which a signal may be transmitted in only one direction at a time.

For a wavelength sequence, such as $\lambda 1, \lambda 2, \ldots, \lambda 40$, a single OADM device has an associated optical loss of about 0.4 dB for reflection and an associated optical loss of about 1 dB for one-way transmission. To perform an add operation and a drop operation for a pair of wavelength components using a conventional OADM device, an add module and a separate drop module are required, with an associated insertion losses of about 0.8 dB for two reflections. This loss might be reduced if a (non-conventional) OADM device can be provided that performs wavelength addition and wavelength dropping in a single device.

What is needed is a simpler OADM system that allows simultaneous addition and dropping of M wavelength pairs without requiring use of 2M OADM modules and related coupling for this purpose. Preferably, such a system should allow use of one pair of coupling channels in a single OADM device to carry one pair of wavelength components to be used in the add/drop operation.

SUMMARY OF THE INVENTION

These needs are met by the invention, which provides a simpler and more reliable system for optical add/drop multiplexing in a fiber optic. Where a conventional OADM approach would require two OADM modules, for example, to provide both add and drop capability for a single wavelength component (2×2 OADM), the invention provides this capability using one such OADM module, differently configured. More generally, M OADM modules, suitably connected in tandem, provide an (M+1)×(M+1) OADM system for control of M wavelength pairs, with M=1, 2, . . . An OADM for a single wavelength uses a dual fiber collimator at a first end and at a second end to Each OADM module component has an associated wavelength filter that transmits a selected wavelength, $\lambda=\lambda 2$, and reflects each of a sequence of wavelengths, $\lambda 1, \lambda 3, \lambda 4, \lambda 5, \ldots, \lambda 40$, from an original sequence $\lambda 1, \lambda 2, \lambda 3, \lambda 4, \lambda 5, \ldots, \lambda 40$. If a light beam containing the wavelength $\lambda=\lambda 2$ approaches the filter in an OADM module component, the wavelength $\lambda=\lambda 2$ is transmitted at the filter, and thus dropped, and other wavelengths from the original sequence, namely $\lambda 1, \lambda 3, \lambda 4, \lambda 5, \ldots, \lambda 40$, are reflected at the filter. Alternatively, if a light beam containing the wavelengths $\lambda 1, \lambda 3, \lambda 4, \lambda 5, \ldots, \lambda 40$ approaches the filter from a first direction (e.g., from the left) and a light beam having the wavelength $\lambda=\lambda 2$ approaches the filter from the opposite direction (e.g., from the right), the wavelength $\lambda=\lambda 2$ will be transmitted through the filter and will join and augment the original light beam to form an exiting light beam that contains the wavelengths $\lambda 1, \lambda 2, \lambda 3, \lambda 4, \lambda 5, \ldots, \lambda 40$.

DETAILED DESCRIPTION OF BEST MODES OF THE INVENTION

Figure 1:
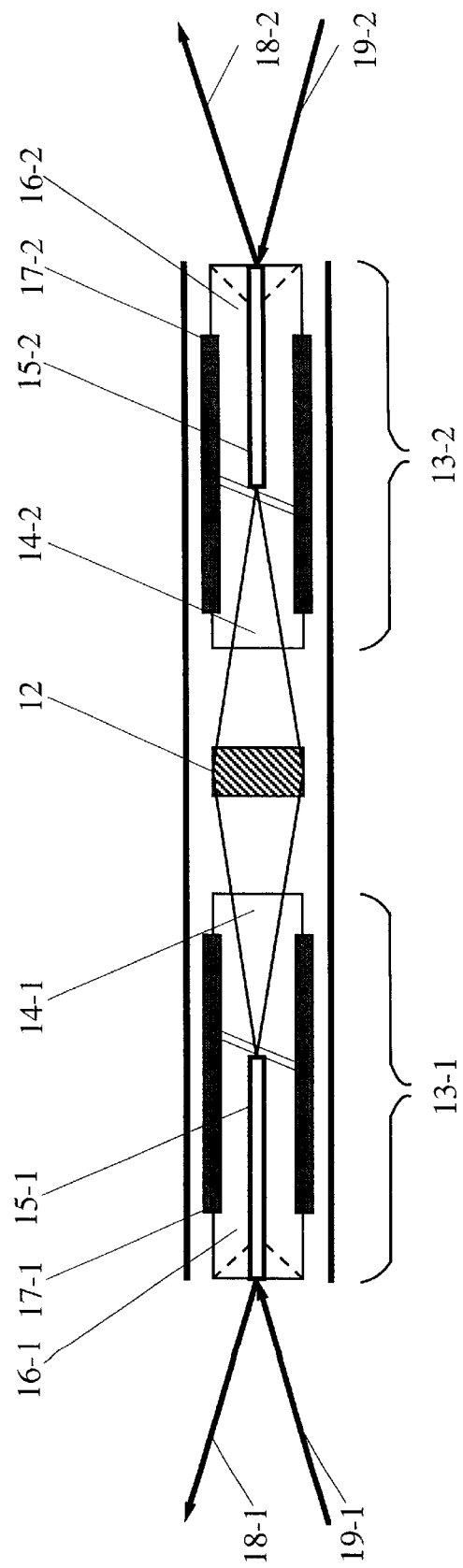
FIG. 1 schematically illustrates an OADM device used in the invention.

FIG. 1A illustrates a suitable construction of an OADM device 11, including two dual fiber collimators, used in the invention. The OADM device 11 includes a multilayer thin film filter 12, preferably positioned between first and second dual fiber collimators, 13-1 and 13-2. The filter 12 is a band pass filter that relies on interference of light to pass a narrow band of wavelengths around a selected central wavelength ($\lambda=\lambda 2$ in FIG. 1) of an ITU channel. A multilayer medium film on one surface of the glass substrate, and an AR coating are deposited on one or more surfaces of the filter 12, a GRIN lens 14-$i$ and/or a dual fiber pigtail 15-$i$. A dual fiber collimator 13-$i$ ($i$=1, 2) includes a dual fiber pigtail 15-$i$ and a gradient index (GRIN) lens 14-$i$, preferably having ¼ pitch. The GRIN lens 14-$i$ is arranged to focus a collimated light beam received from the filter 12 onto a small spot at the fiber core of the pigtail 15-$i$, or to collimate a small spot of light that leaves a pigtail fiber 15-$i$ onto a collimated light beam at the filter 12. The filter 12 has a normal vector oriented at a selected small angle (e.g., 1.8°) relative to a longitudinal axis AA of the OADM device 11 so that light reflected from the filter can be focused onto a core of another pigtail fiber.

A glass tube 16-$i$ and a stainless steel tube 17-$i$ surround the pigtail fiber and the GRIN lens 14-$i$. Optical fibers, 18-$i$ and 19-$i$, are arranged to deliver signals from and/or to deliver signals to the OADM device 11. A dual fiber collimator is disclosed in U.S. Pat. Nos. 6,185,347 and 6,148,126, issued to Zheng Yu, and in U.S. Pat. No. 6,023,542, issued to Jing-Jong Pan et al.

Figure 2A:
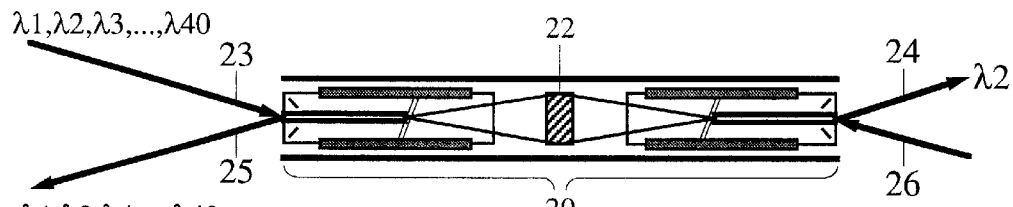
FIGS. 2A and 2B schematically illustrate a dropping functions and an adding function, respectively, of a 2×2 OADM system constructed according to the invention.

A single OADM module, constructed according to the invention, provides both a wavelength add function and a wavelength drop function. FIG. 2A illustrates implementation of a drop function in a 2×2 OADM device 20 constructed according to the invention. The OADM device 20 includes a dual fiber collimator at each end. A first sequence of wavelengths, such as $\lambda 1, \lambda 2, \lambda 3, \ldots, \lambda 40$, is received at the device 20 along a first fiber 23. The wavelength sequence $\lambda 1, \lambda 2, \lambda 3, \ldots, \lambda 40$ is not necessarily monotonic. The OADM device 20 incorporates a filter 22 that transmits a selected wavelength, such as $\lambda = \lambda 2$, and reflects each of the other wavelengths in the sequence, $\lambda 1, \lambda 3, \ldots, \lambda 40$. The filter 22 receives the original sequence of wavelengths, $\lambda 1, \lambda 2, \lambda 3, \ldots, \lambda 40$, transmits (and thus drops) the wavelength $\lambda = \lambda 2$, which proceeds along a second fiber 24 toward the right. An exiting light beam containing a de-augmented sequence of the remaining wavelengths, $\lambda 1, \lambda 3, \ldots, \lambda 40$, proceeds along a third fiber 25 toward the left, away from the device 20.

Figure 2B:
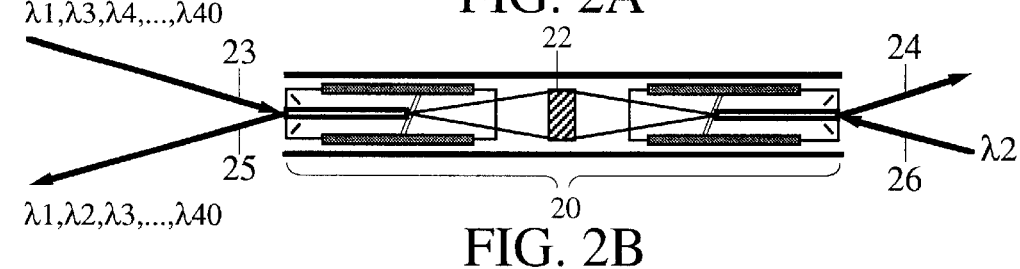

FIG. 2B illustrates implementation of an add function, wherein the device 20 receives a light beam having a sequence of wavelengths, $\lambda 1, \lambda 3, \ldots, \lambda 40$, along the first fiber 23 from the left and receives a light beam having the wavelength $\lambda = \lambda 2$ along a fourth fiber 26 from the right. The wavelength $\lambda = \lambda 2$ is transmitted through the filter 22 and joins, and thus adds to, the reflected wavelengths, $\lambda 1, \lambda 3, \ldots, \lambda 40$, of the original incident beam to form an exiting light beam having an augmented wavelength sequence, $\lambda 1, \lambda 2, \lambda 3, \ldots, \lambda 40$. In normal operations, only one of the drop action shown in FIG. 2A or the add action shown in FIG. 2B would be implemented at a time. However, a single OADM device 20 can perform both actions.

Figure 3A:
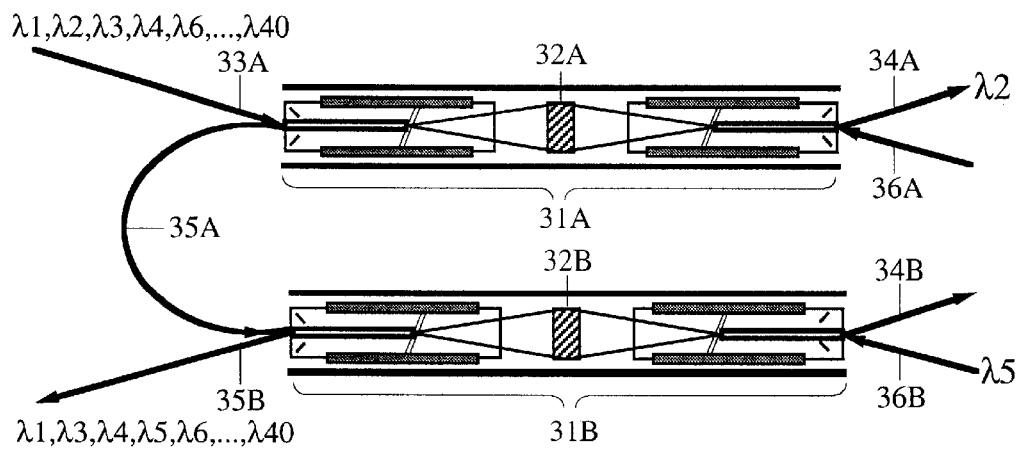
FIGS. 3A and 3B schematically illustrate drop/add and add/drop functions, respectively, of a 3×'OADM system constructed according to the invention.

A 3×'OADM device 30 that performs a drop function ($\lambda = \lambda 2$) and an add function ($\lambda = \lambda 5$) substantially simultaneously is illustrated in FIG. 3A. A light beam having a sequence of wavelengths, $\lambda 1, \lambda 2, \lambda 3, \lambda 4, \lambda 6, \ldots, \lambda 40$, approaches a first OADM module 31A along a first fiber 33A from the left and is received at a first filter 32A. The filter 32A transmits the wavelengths $\lambda = \lambda 2$ and thus drops this wavelength from the original sequence. Light having the dropped wavelength $\lambda = \lambda 2$ proceeds along a second fiber 34A toward the right. The remaining wavelengths, $\lambda 1, \lambda 3, \lambda 4, \lambda 6, \ldots, \lambda 40$, are reflected at the first filter 32A and proceed as a resulting light beam along a third fiber 35A toward the second OADM module 31B and the second filter 32B. A light beam having the wavelength $\lambda = \lambda 5$ is received at the second OADM module 31B along a fourth fiber 36B and is transmitted through the filter 32B. The wavelengths, $\lambda 1, \lambda 3, \lambda 4, \lambda 6, \ldots, \lambda 40$, of the resulting light beam are reflected at the second filter 32B and join the transmitted wavelength $\lambda = \lambda 5$ to form a modified exiting light beam, having the wavelengths $\lambda 1, \lambda 3, \lambda 4, \lambda 5, \lambda 6, \ldots, \lambda 40$, moving along a fiber 35B toward the left. The result of the operations shown in FIG. 3A is to drop a first selected wavelength $\lambda = \lambda 2$ and to add a second selected wavelength $\lambda = \lambda 5$.

Figure 3B:
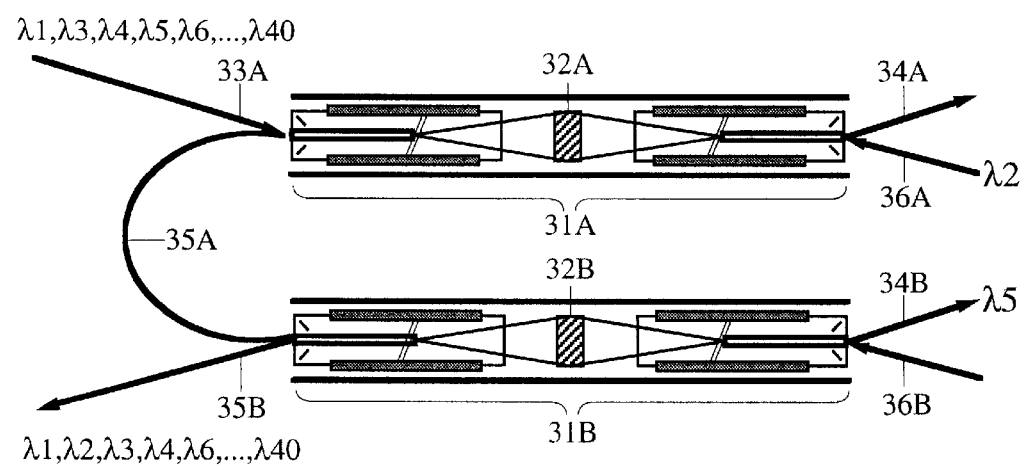

Alternatively, an add function ($\lambda = \lambda 2$) and a drop function ($\lambda = \lambda 5$) can be performed substantially simultaneously, using the same apparatus 30, as illustrated in FIG. 3B. An original light beam having a sequence of wavelengths, $\lambda 1, \lambda 3, \lambda 4, \lambda 5, \lambda 6, \ldots, \lambda 40$, approaches the first OADM module 31A along the fiber 33A from the left and is received at the first filter 32A. A light beam having the wavelength $\lambda = \lambda 2$ is received at the first OADM module 31A from the right along a fiber 36A, is transmitted through the filter 32A, and augments the original light beam. The augmented light beam, having a wavelength sequence $\lambda 1, \lambda 2, \lambda 3, \lambda 4, \lambda 5, \lambda 6, \ldots, \lambda 40$ proceeds along the fiber 35A and is received at the second OADM module 31B. The filter 32B transmits the wavelength $\lambda = \lambda 5$, which travels along a fiber 34B toward the right, and the wavelength $\lambda = \lambda 5$ is thus dropped from the wavelength sequence of the augmented light beam. The remaining light beam, having the wavelengths $\lambda 1, \lambda 2, \lambda 3, \lambda 4, \lambda 6, \ldots, \lambda 40$, proceeds along the fiber 35B toward the left. The result of the operations shown in FIG. 3B is to add a first selected wavelength $\lambda = \lambda 2$ and to drop a second selected wavelength $\lambda 32 \lambda 5$.

The estimated optical insertion optical loss for wavelength add and drop operation associated with a single 2×2 OADM module, constructed according to the invention and shown in FIGS. 1, 2A and 2B, is about 0.4 dB, corresponding to a single reflection. The optical insertion loss for a corresponding conventional OADM device (two modules, one for add and one for drop) is about 0.8 dB.

The estimated insertion optical loss associated with a 3×'OADM device having complete drop/add functions, as illustrated in FIG. 3A or FIG. 3B, is about 0.4 dB (reflection at the first filter 32A)+0.4 dB (reflection at the second filter 32B)=0.8 dB. The optical insertion loss for a corresponding conventional OADM device (four modules, tone for add and one for drop for a first wavelength, and one for add and one for drop for a second wavelength) is about 1.6 dB.

Figure 4A:
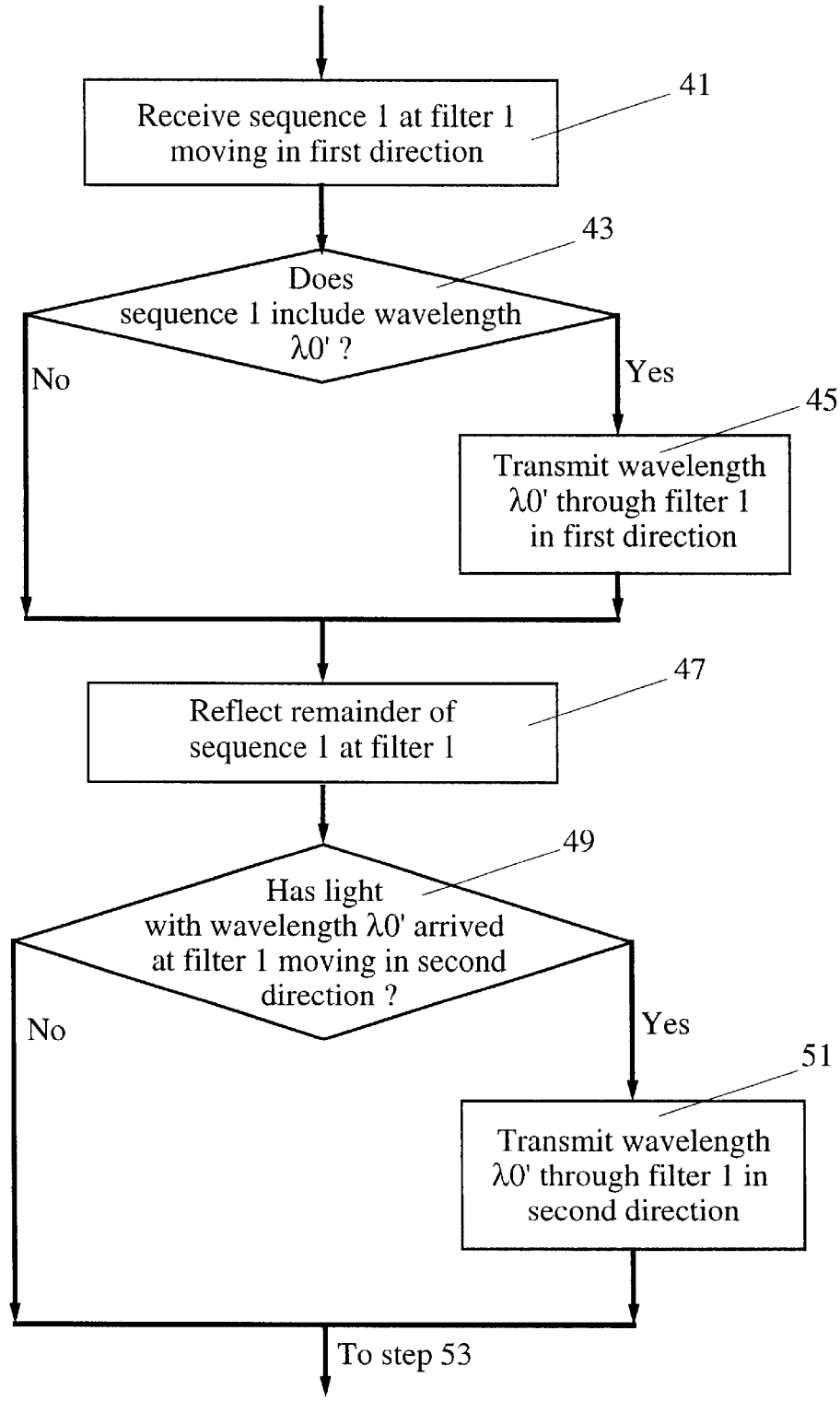
FIGS. 4A and 4B are a flow chart of a procedure for practicing the invention.
Figure 4B:
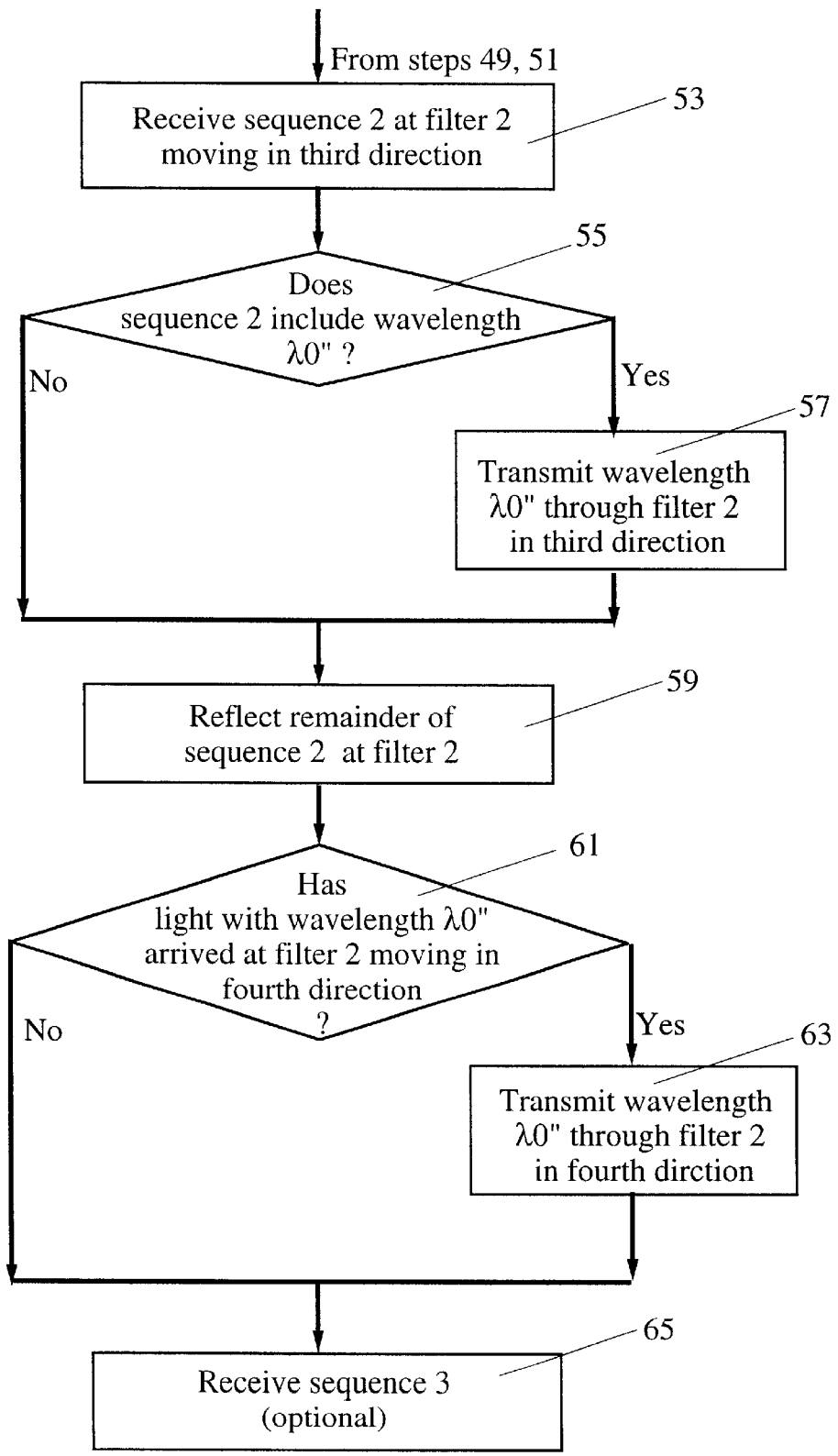

FIGS. 4A and 4B are a flow chart illustrating a procedure for implementing a wavelength drop operation and/or a wavelength add operation according to the invention as illustrated in FIGS. 3A and 3B. In step 41, a first sequence ("sequence 1") of wavelengths, $\lambda 1, \lambda 2, \lambda 3, \lambda 4, \lambda 5, \ldots, \lambda K$ ($K \geq 2$), moving in a first direction, is received at a filter 1 that is part of a first OADM module having two dual fiber collimators. Filter 1 is transmitting for a selected wavelength, $\lambda = \lambda 0'$, and for some wavelengths near this selected wavelength. In step 43, the system determines if sequence 1 includes the wavelength $\lambda 0'$. If the answer to the query in step 43 is "yes," the wavelength $\lambda 0'$ is transmitted through the filter 1 in the first direction, in step 45, and this wavelength is thus deleted from sequence 1. The system then moves to step 47. If the answer to the query in step 43 is "no," the system moves to step 47, where the remainder of the sequence 1 wavelengths are reflected.

In step 49, the system determines if light having a wavelength $\lambda 0'$ has arrived at filter 1 moving in a second direction (opposite to the first direction). If the answer to the query in step 49 is "yes," the wavelength $\lambda 0'$ is transmitted through filter 1 moving in the second direction, in step 51, and joins the reflected wavelengths in sequence 1, thus adding the wavelength $\lambda 0'$ to the sequence. If the answer to the query in step 49 is "no," the system moves to step 51. The resulting sequence ("sequence 2") that moves away from filter 1 in the second direction will have the wavelength $\lambda 0'$ deleted therefrom if $\lambda 0'$ has been dropped and will have an additional wavelength $\lambda 0'$ if this wavelength has been added.

In step 53, sequence 2 of wavelengths, moving in a third direction, is received at a filter 2 that is part of a second OADM module having two dual fiber collimators. Filter 2 is transmitting for a selected wavelength, $\lambda = \lambda 0''$, and for some wavelengths near this selected wavelength. In step 55, the system determines if sequence 2 includes the wavelength $\lambda 0''$. If the answer to the query in step 55 is "yes," the wavelength $\lambda 0''$ is transmitted through the filter 2 in the third direction, in step 57, and this wavelength is thus deleted from sequence 2. The system then moves to step 59. If the answer to the query in step 55 is "no," the system moves to step 59, where the remainder of the sequence 2 wavelengths are reflected.

In step 61, the system determines if light having a wavelength λ0" has arrived at filter 2 moving in a fourth direction (opposite to the third direction). If the answer to the query in step 61 is "yes," the wavelength λ0" is transmitted through filter 2 moving in the fourth direction, in step 63, and joins the reflected wavelengths in sequence 2, thus adding the wavelength λ0" to the sequence 2, and moves to step 65. If the answer to the query in step 61 is "no," the system moves to step 65. The resulting sequence ("sequence 3") that moves away from filter 2 in the fourth direction will have the wavelength λ0" deleted therefrom if λ0' has been dropped and will have an additional wavelength λ0" if this wavelength has been added. In step 65 (optional), sequence 3 is received at a wavelength processing station.

An (M+1)×(M+1) OADM device uses M OADM dual fiber collimator components, each with a selected thin film filter, and 3M−1 fibers suitably arranged. This configuration is simpler, more reliable and less expensive than a conventional (M+1)×(M+1) OADM device, which may use 2M OADM collimators, 2M filters and 6M−1 fibers.

What is claimed is:

1. A system for selectively adding and selectively dropping a wavelength from a sequence of wavelengths carried by an optical fiber structure, the system comprising:

an optical fiber channel, having a first channel end and a second channel end and including an optical filter positioned between the first and second channel ends that transmits substantially all incident light having a wavelength λ equal to one of a group of selected wavelengths, λk1 ($1 \leq k1 \leq K1$), and that reflects substantially all incident light having a wavelength in a selected sequence, λ'k2 ($1 \leq k2 \leq K2$; $K2 \geq 2$), that differs from each of the wavelengths λk1;

a first dual fiber collimator, having first and second optical fibers connected to the first channel end, to deliver a light beam to the channel and to receive a light beam from the channel, respectively, having at least one of the wavelengths λ'1, λ'2, . . . , λ'K2; and a second dual fiber collimator, having third and fourth optical fibers connected to the second channel end, to receive a light beam from the channel and to deliver a light beam to the channel, respectively, having at least one of the wavelengths λk1, whereby light having the wavelength λk1 can be dropped from a light beam having the wavelength λk1 and light having the wavelength λk1 can be added to a light beam that does not have the wavelength λk1.

2. The system of claim 1, further comprising a source for said light beam having said wavelength λk1, connected to said fourth fiber.

3. The system of claim 1, further comprising:

a second optical fiber channel, having a first channel end and a second channel end and including an optical filter positioned between the first and second channel ends of the second channel that transmits substantially all incident light having a wavelength equal to one of a group of selected wavelengths, λ"k3 ($1 \leq k3 \leq K3$), and that reflects substantially all said incident light having a wavelength, λ'k2, in said selected sequence that differs from each of said wavelengths λ"k3;

a third dual fiber collimator, having fifth and sixth optical fibers connected to the second channel first end, to deliver a light beam to the second channel and to receive a light beam from the second channel, respectively, having at least one of the wavelengths λ1, λ2, . . . , λK1, where the fifth fiber is connected to said second fiber; and a fourth dual fiber collimator, having seventh and eighth optical fibers connected to the second channel second end, to receive a light beam from the second channel and to deliver a light beam to the second channel, respectively, having the wavelength λ'k2, whereby light having the wavelength λ'k2 can be dropped from a light beam having the wavelength λ'k2 and light having the wavelength λ'k2 can be added to a light beam that does not have the wavelength λ'k2.

4. The system of claim 3, wherein:

a delivered light beam, having said wavelength λk1 and not having said wavelength λ"k3, is delivered to said first optical fiber channel along said first fiber; and light having said wavelength λ"k3 is delivered to said second channel along said eighth fiber, whereby light having said wavelength λk1 is dropped from the delivered light beam and light having said wavelength λ"k3 is added to the delivered light beam, with an optical loss of about 0.8 dB.

5. The system of claim 3, wherein:

a light beam, not having said wavelength λk1 and having said wavelength λ"k3, is delivered to said first optical fiber channel along said first fiber; and light having said wavelength λk1 is delivered to said first channel along said fourth fiber, whereby light having said wavelength λk1 is added to the delivered light beam and light having said wavelength λ"k3 is dropped from the delivered light beam, with an optical loss of about 0.8 dB.

6. A method for selectively adding and selectively dropping a wavelength from a sequence of wavelengths carried by an optical fiber structure, the method comprising:

providing an optical fiber channel, having a first end and a second end and including an optical filter positioned between the first and second ends that transmits substantially all incident light having a wavelength λ equal to one of a group of selected wavelengths, λk1 ($1 \leq k1 \leq K1$), and that reflects substantially all incident light having a wavelength in a selected sequence, λ'k2 ($1 \leq k2 \leq K2$; $K2 \geq 2$), that differs from each of the wavelengths λk1;

providing a first dual fiber collimator, having first and second optical fibers connected to the first channel end, to deliver a light beam to the channel and to receive a light beam from the channel, respectively, having at least one of the wavelengths λ'1, λ'2, . . . , λ'K2; and providing a second dual fiber collimator, having third and fourth optical fibers connected to the second channel end, to receive a light beam from the channel and to deliver a light beam to the channel, respectively, having at least one of the wavelengths λk1; and performing at least one of the following actions:

(i) delivering a selected light beam having at least one of the wavelengths λk1 to the channel along the first fiber, to thereby drop light having at least one of the wavelengths λk1 from the selected light beam; and (ii) delivering a selected light beam not having the wavelength λk1 to the channel along the first fiber and delivering light having the wavelength λk1 to the channel along the fourth fiber, to thereby add light having the wavelength λk1 to the selected light beam.

7. The method of claim 6, further comprising providing a source of light that includes said wavelength $\lambda k1$, adjacent to said fourth fiber, to deliver said light having said wavelength $\lambda k1$ to said channel.

8. The method of claim 6, further comprising providing a second optical fiber channel, having a first end and a second end and including an optical filter positioned between the first and second ends of the second channel that transmits substantially all incident light having a wavelength equal to one of a group of selected wavelengths, $\lambda"k3$ ($1 \leq k3 \leq K3$), and that reflects substantially all said incident light having a wavelength, $\lambda'k2$, in said selected sequence that differs from each of said wavelengths $\lambda"k3$;

providing a third dual fiber collimator, having fifth and sixth optical fibers connected to the second channel first end, to deliver a light beam to the second channel and to receive a light beam from the second channel, respectively, having at least one of the wavelengths $\lambda 1, \lambda 2, \ldots, \lambda K1$, where the fifth fiber is connected to said second fiber; and providing a fourth dual fiber collimator, having seventh and eighth optical fibers connected to the second channel second end, to receive a light beam from the second channel and to deliver a light beam to the second channel, respectively, having the wavelength $\lambda'k2$; and performing at least one of the following two actions:

(i) delivering a selected light beam having the wavelength $\lambda'k2$ to the channel along said first fiber, to thereby drop light having the wavelength $\lambda'k2$ from the selected light beam; and (ii) delivering a selected light beam not having the wavelength $\lambda'k2$ to the channel along said first fiber and delivering light having the wavelength $\lambda'k2$ to the channel along said fourth fiber, to thereby add light having the wavelength $\lambda'k2$ to the selected light beam.

9. The method of claim 8, further comprising performing said at least one of said two actions with an optical loss of about 0.8 dB.

\* \* \* \* \*